United States Patent
Morris

(10) Patent No.: US 10,110,421 B2
(45) Date of Patent: Oct. 23, 2018

(54) METHODS, SYSTEMS, AND COMPUTER READABLE MEDIA FOR USING LINK AGGREGATION GROUP (LAG) STATUS INFORMATION

(71) Applicant: Oracle International Corporation, Redwood Shores, CA (US)

(72) Inventor: Robert Michael Morris, Raleigh, NC (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/927,377

(22) Filed: Oct. 29, 2015

(65) Prior Publication Data

US 2017/0126478 A1     May 4, 2017

(51) Int. Cl.
| | |
|---|---|
| *H04L 12/24* | (2006.01) |
| *H04L 12/26* | (2006.01) |
| *H04L 12/703* | (2013.01) |
| *H04L 12/707* | (2013.01) |
| *H04L 12/709* | (2013.01) |

(52) U.S. Cl.
CPC ...... *H04L 41/0654* (2013.01); *H04L 43/0811* (2013.01); *H04L 43/0882* (2013.01); *H04L 45/28* (2013.01); *H04L 45/22* (2013.01); *H04L 45/245* (2013.01)

(58) Field of Classification Search
CPC combination set(s) only.
See application file for complete search history.

(56) References Cited

U.S. PATENT DOCUMENTS

| | | |
|---|---|---|
| 4,532,625 A | 7/1985 | Stover |
| 7,756,029 B2 | 7/2010 | Licardie et al. |
| 7,881,185 B1 | 2/2011 | Karl et al. |
| 7,912,091 B1 * | 3/2011 | Krishnan ............... H04L 45/02 370/490 |

(Continued)

OTHER PUBLICATIONS

Commonly-assigned, co-pending U.S. Appl. No. 14/873,112 for "Methods, Systems, and Computer Readable Media for Transmitting Diameter Peer Status Information," (Unpublished, filed Oct. 1, 2015).

(Continued)

*Primary Examiner* — Yee Lam
(74) *Attorney, Agent, or Firm* — Jenkins, Wilson, Taylor & Hunt, P.A.

(57) ABSTRACT

Methods, systems, and computer readable media for using link aggregation group (LAG) status information are disclosed. According to one method, the method includes receiving LAG status information about a first LAG, wherein the LAG status information indicates that at least one link of the first LAG is operational. The method also includes determining, using the LAG status information about the first LAG, whether to perform a failover operation such that a second LAG is used instead of the first LAG. The method further includes in response to determining to perform the failover operation, performing the failover operation such that the second LAG is used instead of the first LAG and in response to determining not to perform the failover operation, continuing to use the first LAG without performing the failover operation.

20 Claims, 5 Drawing Sheets

| LAG ID | LAG MEMBERS (E.G., LINK\PORT IDENTIFIERS) | LINK STATUS INFORMATION | AGGREGATED CAPACITY |
|---|---|---|---|
| LAG1-1 | PORT 1<br>PORT 2<br>PORT 3<br>PORT 4 | 1110 | 30 Gbps (MAX. 40 Gbps) |
| LAG1-2 | PORT 5<br>PORT 6<br>PORT 7<br>PORT 8 | 1111 | 20 Gbps (MAX. 20 Gbps) |
| LAG2-1 | PORT 9<br>PORT 10<br>PORT 12<br>PORT 13 | 1111 | 20 Gbps (MAX. 20 Gbps) |
| LAG2-2 | PORT 14<br>PORT 15<br>PORT 16<br>PORT 17 | 1111 | 40 Gbps (MAX. 40 Gbps) |

200

(56) References Cited

U.S. PATENT DOCUMENTS

| | | |
|---|---|---|
| 8,081,620 B2 | 12/2011 | Rouyer et al. |
| 8,402,132 B2 | 3/2013 | Kang et al. |
| 8,468,267 B2 | 6/2013 | Yigang et al. |
| 8,644,156 B2 | 2/2014 | Rai et al. |
| 8,761,005 B2 | 6/2014 | Subramanian |
| 9,088,478 B2 | 7/2015 | Craig et al. |
| 9,094,293 B2 | 7/2015 | Liang |
| 2005/0232407 A1 | 10/2005 | Craig et al. |
| 2008/0240133 A1* | 10/2008 | Tanaka ............... H04L 45/245 370/401 |
| 2010/0265831 A1* | 10/2010 | Hachiya ............. H04L 49/3009 370/248 |
| 2010/0299451 A1 | 11/2010 | Yigang et al. |
| 2011/0040845 A1 | 2/2011 | Cai et al. |
| 2011/0199906 A1 | 8/2011 | Kanode et al. |
| 2011/0202676 A1 | 8/2011 | Craig et al. |
| 2012/0036246 A1 | 2/2012 | Marsico |
| 2013/0121141 A1 | 5/2013 | Hao |
| 2013/0275583 A1 | 10/2013 | Roach et al. |
| 2014/0269255 A1 | 9/2014 | Zeng et al. |
| 2015/0271103 A1* | 9/2015 | Thayalan ............... H04L 49/25 370/217 |
| 2015/0271708 A1 | 9/2015 | Zaus et al. |
| 2017/0099202 A1 | 4/2017 | Renzullo et al. |

OTHER PUBLICATIONS

Wang et al., "OpenFlow-Based Server Load Balancing Gone Wild," https://www.usenix.org/legacy/event/notice11/tech/full_papers/Wang_Richard.pdf, pp. 1-6, (2011).

Fajardo et al., "Diameter Base Protocol," RFC 6733, pp. 1-152 (Oct. 2012).

Non-Final Office Action for U.S. Appl. No. 14/873,112 (dated Jul. 14, 2017).

Advisory Action and Applicant-Initiated Interview Summary for U.S. Appl. No. 14/873,112 (dated Apr. 20, 2018).

Final Office Action for U.S. Appl. No. 14/873,112 (dated Jan. 24, 2018).

Notice of Allowance and Fee(s) Due for U.S. Appl. No. 14/873,112 dated May 31, 2018.

\* cited by examiner

| LAG ID | LAG MEMBERS (E.G., LINK\PORT IDENTIFIERS) | LINK STATUS INFORMATION | AGGREGATED CAPACITY |
|---|---|---|---|
| LAG1-1 | PORT 1<br>PORT 2<br>PORT 3<br>PORT 4 | 1110 | 30 Gbps<br>(MAX. 40 Gbps) |
| LAG1-2 | PORT 5<br>PORT 6<br>PORT 7<br>PORT 8 | 1111 | 20 Gbps<br>(MAX. 20 Gbps) |
| LAG2-1 | PORT 9<br>PORT 10<br>PORT 12<br>PORT 13 | 1111 | 20 Gbps<br>(MAX. 20 Gbps) |
| LAG2-2 | PORT 14<br>PORT 15<br>PORT 16<br>PORT 17 | 1111 | 40 Gbps<br>(MAX. 40 Gbps) |

METHODS, SYSTEMS, AND COMPUTER READABLE MEDIA FOR USING LINK AGGREGATION GROUP (LAG) STATUS INFORMATION

TECHNICAL FIELD

The subject matter described herein relates to network communications. More specifically, the subject matter relates to methods, systems, and computer readable media for using link aggregation group (LAG) status information.

BACKGROUND

Link aggregation is the concept of combining or aggregating multiple links (e.g., network connections or ports) into a logical link or interface. For example, layer 2 network switches are often connected to each other using link aggregation groups (LAGs) where multiple physical ports function as a single logical link. A LAG may also be referred to as a port channel, and a link may also be referred to as a port.

Link aggregation can also be used in redundancy scenarios. For example, a network may include a LAG associated with a primary node or path and a LAG associated with a backup node or path. One problem with some current link aggregation mechanisms is that in a redundancy scenario all links in a primary LAG must fail before performing a failover operation. As such, these link aggregation mechanisms can result in poor network resource utilization and/or decreased traffic throughput in certain situations.

Accordingly, there exists a need for methods, systems, and computer readable media for using LAG status information.

SUMMARY

Methods, systems, and computer readable media for using link aggregation group (LAG) status information are disclosed. According to one method, the method includes receiving LAG status information about a first LAG, wherein the LAG status information indicates that at least one link of the first LAG is operational. The method also includes determining, using the LAG status information about the first LAG, whether to perform a failover operation such that a second LAG is used instead of the first LAG. The method further includes in response to determining to perform the failover operation, performing the failover operation such that the second LAG is used instead of the first LAG and in response to determining not to perform the failover operation, continuing to use the first LAG without performing the failover operation.

According to one system, the system includes a network switch. The network switch includes a processor and a memory. The network switch is configured to receive LAG status information about a first LAG, wherein the LAG status information indicates that at least one link of the first LAG is operational, to determine, using the LAG status information about the first LAG, whether to perform a failover operation such that a second LAG is used instead of the first LAG, in response to determining to perform the failover operation, to perform the failover operation such that the second LAG is used instead of the first LAG and in response to determining not to perform the failover operation, to continue to use the first LAG without performing the failover operation.

The subject matter described herein may be implemented in software in combination with hardware and/or firmware. For example, the subject matter described herein may be implemented in software executed by a processor. In some implementations, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors and memory. For example, a node may include a virtual machine and/or other software executing on a physical computing platform.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which:

FIG. 2 is a diagram illustrating link aggregation group (LAG) status information according to an embodiment of the subject matter described herein;

DETAILED DESCRIPTION

Figure 1:
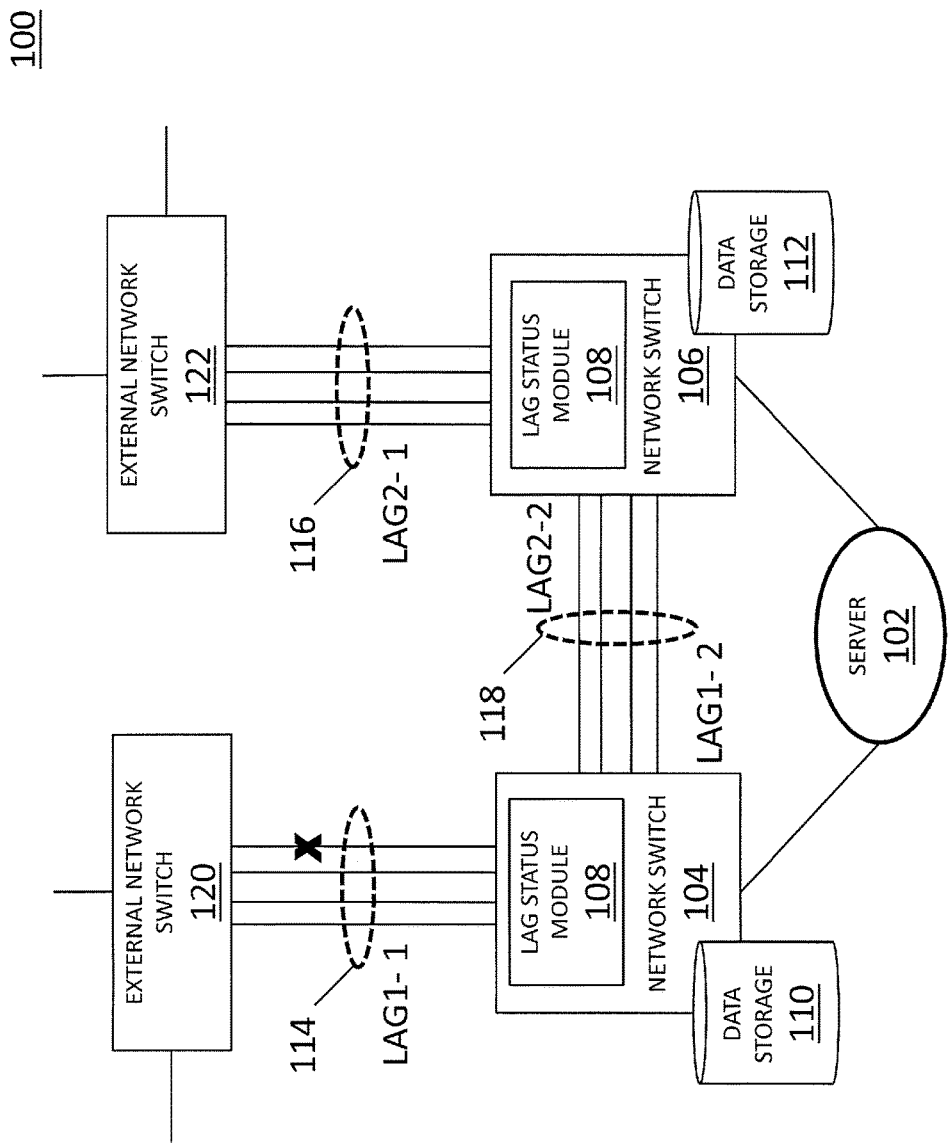
FIG. 1 is a diagram illustrating a network according to an embodiment of the subject matter described herein.

The subject matter described herein relates to methods, systems, and computer readable media for using link aggregation group (LAG) status information. LAGs are generally useful for load sharing traffic among multiple links or ports to a destination. For example, a LAG may represent or include multiple egress ports or links associated with a same destination. In this example, a network node may use a load sharing algorithm to share traffic among the links of a LAG. By using a LAG with multiple links, a network node can send traffic to a destination at a greater rate and/or amount since the aggregated or combined capacity of a LAG is generally greater than the individual capacity of any single link of the LAG.

While LAGs are useful for load sharing traffic, LAGs can also be used in redundancy or backup scenarios. For example, in a network with redundant nodes connected via one LAG and primary nodes connected via another LAG, the LAG utilized by a redundant or backup node may be inactive for a substantial amount of time, while the other LAG utilized by a primary node may be active for a substantial amount of time. In this example, the "backup"

LAG may only be utilized after a failover occurs, whereby the redundant node becomes the primary node and the primary node becomes the backup node. When this happens, the "primary" LAG may become inactive. Generally, LAG related protocols initiate failovers when all links associated with the "primary" LAG fail.

In accordance with some aspects of the subject matter described herein, techniques, methods, or mechanisms are disclosed for using LAG status information when determining whether to perform a failover operation. For example, two network switches may utilize a link aggregation protocol and may be associated with a different LAG. In this example, each network switch may exchange LAG status information (e.g., status related information about one or more LAGs) with each other. By exchanging LAG status information, each network switch can know the number or amount of operational or usable links in a given LAG and/or other characteristics, e.g., an aggregated capacity of the LAG. As such, each network switch may use this LAG status information when determining whether or not to perform a failover operation.

In accordance with some aspects of the subject matter described herein, techniques, methods, or mechanisms are disclosed for determining whether to perform a failover operation after one or more link failures associated with a LAG. For example, rather than blocking traffic to a LAG when all links in the LAG fails, after each link failure, a network switch may compare the number of operational links in the LAG to the number of operational links in another LAG associated with another network switch. In this example, if the network switch determines that the other LAG has more operational links, the network switch may perform the failover operation such that the other LAG is utilized. Continuing with this example, if the network switch determines that the other LAG does not have more operational links, the network switch may continue using its associated LAG without performing the failover operation.

In accordance with some aspects of the subject matter described herein, techniques, methods, or mechanisms are disclosed for sending LAG status information to one or more network nodes. For example, after a change in status of a first LAG is detected, a LAG status update message indicating LAG status information about the first LAG may be generated and sent to a network node. In this example, the LAG status update message may trigger the network node to determine whether to perform a failover operation or other traffic related actions, such as modifying port tables (e.g., network switching or routing tables) for changing traffic load distribution.

Advantageously, in accordance with some aspects of the subject matter described herein, LAG status information may be utilized to make better, more informed decisions regarding failover operations or other traffic related operations, thereby increasing network resource utilization and/or traffic throughput.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a diagram illustrating a network 100 according to an embodiment of the subject matter described herein. Network 100 may represent any network that includes LAGs and/or use LAG related protocols, such as a link aggregation control protocol. Network 100 may include server 102, network switches 104-106, and external network switches 120-122. Server 102 may represent any suitable entity (e.g., a computing platform or device) for providing services and generating traffic for one or more clients or other entities. For example, server 102 may represent a web server or other server for sending hypertext transfer protocol (HTTP) messages and/or messages or packets to various network nodes. In some embodiments, server 102 may distribute traffic via multiple network switches 104-106.

Each of network switches 104-106 and external network switches 120-122 may represent any suitable entity for network switching, forwarding, and/or sending traffic (e.g., packets) to or from various network nodes. For example, network switch 104 may be include open systems interconnection (OSI) model layer 2-7 device and may route, network switch, or forward data packets associated with various protocols. Network switches 104-106 may utilize one or more LAGs, such as LAGs 114-118. For example, network switch 104 and network switch 106 may be connected via LAG 118. In this example, LAG 118 may represent an inter-network switch connection. In another example, network switch 104 may be connected to external network switch 120 via LAG 114 and network switch 106 may be connected to external network switch 122 via LAG 116.

In some embodiments, each of external network switches 120-122 may send traffic to various other networks and/or nodes, e.g., devices that are external to network 100. For example, external network switches 120-122 may be part of and/or may provide traffic to the Internet or another data network. In this example, server 102 may utilize one or more LAGs via network switches 104-106 to reach external network switches 120-122 and, ultimately, other destinations.

Each of LAG 114-118 may represent a logical group of links or ports associated with a destination. For example, LAG 114 may include four egress ports at network switch 104. In this example, the four egress ports of LAG 114 may be associated with different physical links and/or logical communication paths, where each link or path may be associated with different characteristics, e.g., bandwidth, quality of service (QoS), and/or congestion. Continuing with this example, by using LAG 114, traffic may be communicated at a greater rate and/or a greater volume than using any single link of LAG 114 alone.

In some embodiments, network 100 may be configured for redundancy. For example, network 100 may include a primary path and a backup path for communications between server 102 and an external network. In this example, the primary path may involve network switch 104, LAG 114, and external network switch 120 and the backup path may involve network switch 106, LAG 116, and external network switch 122. In some embodiments, a backup path may remain inactive until a failover operation is performed. In some embodiments, In some embodiments, functionality for determining, detecting, receiving, using, and/or sending LAG status information may be incorporated into one or more modules, such a LAG status module 108. LAG status module 108 may represent any suitable entity or entities (e.g., software executing on a processor, an application-specific integrated circuit (ASIC), and/or a field-programmable gate array (FPGA)) for performing aspects related to determining and/or sending LAG status information. For example, LAG status module 108 may be implemented using a special purpose computing device comprising a physical processor and a memory.

In some embodiments, LAG status module 108 and/or functionality therein may be located at or utilized by various entities, such as network switch 104-106, server 102, and/or external network switches 120-122, in network 100. For example, LAG status module 108 at network switch 104 may be usable for determining LAG status information (e.g., any information usable for routing or forwarding related decisions, such as link status information, congestion information, connection priority, or other information) associated with LAG 114 (e.g., egress ports logically grouped and used to send traffic to a same destination) and for sending the LAG status information to other network nodes using a map, such as a bitmap, where each value or position in the map indicates a operational status associated with a particular link of LAG 114.

In some embodiments, determining LAG status information about a LAG may involve sending and receiving 'heartbeat' messages, such as network discovery protocol messages. In such embodiments, LAG status module 108 may be configured to determine whether a 'heartbeat' message is not received via a particular link of a LAG within a specific time period. If a 'heartbeat' message is not received within a specific time period, the status of the link may be considered non-operational. Otherwise, in such embodiments, if a 'heartbeat' message is received within the specific time period, the status of the link may be considered operational.

In some embodiments, LAG status module 108 and/or related network nodes may include functionality for receiving or sending LAG status information. For example, each of network switches 104-106 may exchange LAG status information. Examples of LAG status information that may be exchange includes an amount of operational links associated with a LAG, an aggregated capacity of a LAG, individual link capacities of one or more links of a LAG, QoS information associated with a LAG, and/or congestion information associated with a LAG.

In some embodiments, LAG status module 108 and/or related network nodes may exchange LAG status information via an inter-network switch connection, such as LAG 118, or another connection. For example, LAG status update messages or other messages indicating LAG status information may be sent by network switch 104 to network switch 106 every five seconds. In another example, LAG status update messages or other messages indicating LAG status information may be sent dynamically based on detected changes in LAG status, network conditions, and/or network operator preferences.

In some embodiments, LAG status module 108 and/or related network nodes may use LAG status information for determining whether to perform various traffic related actions. For example, network switch 104 and/or LAG status module 108 may use LAG status information obtained from various sources when determining whether to perform a failover operation from LAG 114 to LAG 116. In this example, determining whether to perform the failover operation may involve determining which LAG has better characteristics (e.g., a greater amount of operational links, a greater aggregated capacity or bandwidth, better QoS, and/or less congestion).

In contrast to conventional link aggregation protocols that perform a failover operation when one or more links of a current LAG fail, aspects of the subject matter described herein allow decisions regarding failover operations and other traffic related actions to be determined using various LAG status information received from one or more sources, thereby preventing failover operations and/or other traffic related actions that are ineffective or exacerbates traffic issues.

In some embodiments, prior to or concurrently with sending LAG status information, LAG status module 108 and/or functionality therein may send LAG related information to an entity for determining how to process, determine, or derive the LAG status information from a map. For example, LAG status module 108 and/or functionality therein may send LAG related information including a LAG identifier and an ordered list of port identifiers indicating various links of a LAG. In this example, the ordered list may indicate which value or position in a bitmap represents the status of a particular link of a LAG.

Each of data storages 110-112 may represent any suitable entity (e.g., a non-transitory computer readable medium, embedded memory, or a memory device) for storing data associated with LAG status information. Data storages 110-112 may store associations between LAG identifiers and LAG member identifiers. Data storages 110-112 may also include LAG status information associated with one or more LAGs, including link statuses, QoS information, congestion information, and/or LAG configuration information.

In some embodiments, each of data storages 110-112 may be accessible by network switch 104, network switch 106, LAG status module 108, and/or other entities. In some embodiments, each of data storages 110-112 may be located on a single device or computing platform or may be distributed across multiple devices or computing platforms.

It will be appreciated that FIG. 1 is for illustrative purposes and that various nodes, their locations, and/or their functions (e.g., modules) described above in relation to FIG. 1 may be changed, altered, added, or removed. For example, some nodes and/or functions may be combined into a single entity. In another example, some nodes and/or functions may be distributed across multiple nodes and/or platforms.

FIG. 2 is a diagram illustrating LAG status information 200 according to an embodiment of the subject matter described herein. LAG status information 200 may represent any information associated with using LAGs, such as LAG identifiers, LAG member identifiers, link status and/or connectivity information (e.g., maps, bitmaps, etc.) for links in a LAG, and/or recipients for receiving LAG status information. In some embodiments, LAG status information 200 may be accessed and/or stored by network switch 104, network switch 106, and/or LAG status module 108. In some embodiments, LAG status information 200 may be stored in data storage 110 and/or data storage 112 using various data structures.

Referring to FIG. 2, LAG status information 200 may include associations between LAG identifiers, LAG members, and related LAG status information and may be depicted using a table. For example, a table representing LAG status information 200 may comprise columns and/or fields for a LAG identifier, LAG member identifiers, link status information (e.g., represented using bitmaps), aggregated capacity information, and/or recipients.

A LAG identifier field may comprise a value, a name, and/or a related identifier for indicating a LAG. For example, a LAG ID may include a unique number or name. In FIG. 2, each LAG identifier indicates the entity that compiles or obtains the LAG status information (e.g., 'LAG1') and a unique number for identifying that LAG at the obtaining entity (e.g., '1') separated by a dash, e.g., 'LAG1-1', 'LAG1-1', 'LAG2-1', and 'LAG2-2'. In some embodiments, where LAG related information is only stored for one LAG connected entity, a LAG identifier may omit information indicating the entity, e.g., 'LAG1', 'LAG2', and 'LAG3'.

In some embodiments, a LAG may be identified differently by different network nodes. For example, LAG 114 may be identified as 'LAG1-2' by network switch 104 and/or LAG status module 108 therein and may be associated with egress ports 5-8 of network switch 104. In this example, LAG 114 may also be identified as 'LAG2-2' by network switch 106 and/or LAG status module 108 therein and may be associated with egress ports 14-17 of network switch 106.

A LAG members field may comprise one or more values, names and/or identifiers for indicating members (e.g., links or ports) associated with a LAG. For example, a LAG members field may include a plurality of identifiers for indicating a plurality of links or ports associated with a LAG 114.

In some embodiments, a LAG members field may indicate an order related to the links of a LAG. For example, a LAG members field may include an ordered list or another data structure for indicating an order associated with the LAG members. In this example, the order and/or other LAG related information may be transmitted to various recipients and used when processing LAG status information, e.g., represented as a bitmap.

A link status information field may comprise information for indicating link status information for one or more links (e.g., ports) associated with a LAG. For example, a link status information field may include information for indicating whether connectivity (e.g., the ability for messages to reach a destination from an origination and vice versa) exists between two nodes. In this example, link status information for each LAG member may be indicated by a value stored in a different position in a bitmap or bytemap.

In some embodiments, a map may represent current status of one or more LAG members of a LAG. For example, a map may include a bitmap, a multi-bitmap, a byte map, or a multi-byte map. In this example, a map may include the same number of values as the number of LAG members, where each value in the map (e.g., each bit in the bitmap) may represent a status for a particular LAG member. Continuing with this example, if a bit is used to represent status or connectivity for a particular LAG member, the value '0' (zero) may indicate no connectivity and the value '1' (one) may indicate connectivity. In another example, e.g., where values (e.g., bytes, words, multi-bit values) in a map may represent more than two statuses, a value may represent various types or levels of connectivity or LAG status information, e.g., no connectivity, limited connectivity, congestion, normal connectivity, preferred connectivity (e.g., a particular route weight), and/or other LAG status information.

In some embodiments, LAG status information may be stored and/or transmitted as values in a map based on a known or discernable order, referred to herein as a mapping order. For example, prior to receiving a map representing LAG status information for various peer nodes in a LAG 114 from network switch 104, network switch 104 may send a message indicating an order of LAG members for LAG 114. In this example, a receiving entity may use the ordered list to process the map and determine the appropriate LAG status information, such as identifying the least significant bit as representing the status for the first link in the list, identifying the second least significant bit as representing the status for second link in the list, the third least significant bit as representing the status for third link in the list, and so on and so forth.

An aggregated capacity field may comprise information for indicating aggregated or combined capacity or bandwidth associated with a LAG. For example, an aggregated capacity field may include information for indicating a total or combined capacity or bandwidth associated with LAG 114 by summing individual capacities associated with links of LAG 114. In this example, LAG 114 may include four links, where each link has a 10 gigabits per second (Gbps) capacity; thereby LAG 114 may have an aggregated capacity of 40 Gbps, if all links are operational. Continuing with this example, if only three links are operational, LAG 114 may have an aggregated capacity of 30 Gbps.

In some embodiments, an aggregated capacity field or another field may store individual link capacities and/or other information for a LAG. For example, LAG status module 108 may use knowledge about each link capacity of each link of LAG 116 to compute an aggregated capacity for LAG 116. In this example, such knowledge is especially useful in scenarios where different links of a LAG have different capacities.

In some embodiments, LAG status information 200 may also include other characteristics for determining whether one LAG is preferable to another LAG. For example, LAG status information 200 may also indicate quality of service (QoS) information, quality of performance (QoS) information, LAG link quality, congestion information, latency, jitter, and/or other metrics or characteristics associated with a LAG.

It will also be appreciated that LAG status information 200 is for illustrative purposes and that additional data than the data depicted in FIG. 2 may be usable for detecting, receiving, sending, and/or using LAG status information. Further, LAG status information 200 may be stored or managed using various data structures and/or computer readable media. Further, some LAG status information 200 may be stored in separate and/or different locations. For example, LAG related information associated with network switch 104 may be stored at data storage 110 and LAG related information associated with network switch 106 may be stored at data storage 112.

Figure 3:
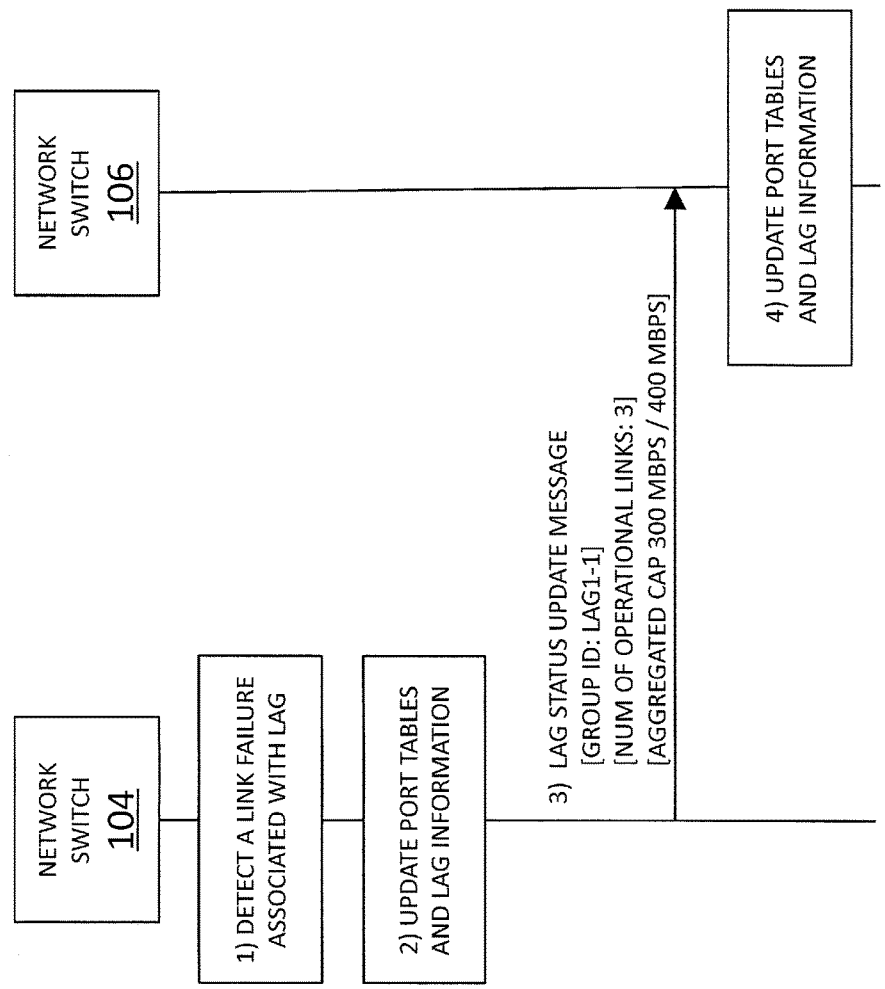
FIG. 3 is a diagram illustrating using LAG status information according to an embodiment of the subject matter described herein.

FIG. 3 is a diagram illustrating using LAG status information according to an embodiment of the subject matter described herein. In some embodiments, prior to transmitting or sending LAG status information to one or more network nodes (e.g., network switch 104 or network switch 106), various mechanisms may be usable for sending LAG related information and/or configuration data to the plurality of network nodes such that the plurality of network nodes can process, determine, and/or derive received LAG status information.

In some embodiments, LAG related information and/or configuration information associated with LAG status information may be sent using various messages and/or protocols, including proprietary and non-proprietary protocols and/or data formats. Some possible protocols for sending LAG related information and/or configuration data associated with LAG status information may include a link aggregation control protocol (LACP), a distributed routing and management application (DRMA) protocol, a hypertext transfer protocol (HTTP), an Internet protocol (IP) protocol, and/or other protocols.

For example, prior to step 1 of FIG. 3, network switch 104 may send LAG related information about LAG 114 to network switch 106. In this example, the LAG related information may indicate that LAG 114 is associated with an identifier 'LAG1-1' and that LAG 114 includes a certain number of links and a capacity or bandwidth associated with each link. Continuing with this example, network switch 106 may use this information for determining how to process, determine, and/or derive LAG status information sent from network switch 104 regarding LAG 114.

In some embodiments, LAG related information may be sent as a payload in a LAG status update message. In some embodiments, LAG related information may be stored in one or more parameters or attribute value pairs (AVPs) in various messages. For example, a LAG status update message may include information indicating an LAG identifier and information indicating a maximum aggregated capacity of a LAG or other characteristics associated with the LAG. In this example, the LAG status update message may be LACP message or another type of message.

In some embodiments, LAG related information may include information indicating an ordered list of links associated with a LAG. In this example, using the LAG related information, each recipient (e.g., network switch 106) may be capable of discerning that a map representing LAG status information for LAG 114 would include four values (e.g., one value for each LAG member), where the first value in the map represents the status of a first link in LAG 114 (e.g., the first identifier in the ordered list) and the second value in the map represents the status of a second link in LAG 114 (e.g., the second identifier in the ordered list) and so on and so forth. In another example, other mechanisms, messages, and/or information may be used for deriving or determining LAG status information from map values.

In some embodiments, after providing LAG related information to one or more recipients of LAG status information, a status transmitting network node (e.g., network switch 104) may determine LAG status information, such as an aggregated capacity (e.g., the combined bandwidth of all available (e.g., operable) links in a LAG) of a LAG and may then provide the LAG status information to relevant entities (e.g., network switch 106).

In step 1, a link failure associated with a LAG may be detected by network switch 104. For example, network switch 104 may be configured to send traffic to external network switch 120 via LAG 114. In this example, network switch 104 may use one or more load balancing algorithms (e.g., round robin, least utilized, etc.) to send traffic via the various links of LAG 114. In this example, a link failure may be detected by receiving an error message indicating that one or more packets or frames were not received via a particular link. In another example, a link failure may be detected by determining that traffic has not been received (e.g., from external network switch 120) via a particular link of LAG 114 within an acceptable time period (e.g., within the last two minutes).

In step 2, after detecting a link failure associated with a LAG, port tables (e.g., network switching tables) and/or LAG related information may be updated by network switch 104. For example, network switch 104 may be configured to store information about LAG 114 in data storage 110. In this example, if a link fails, network switch 104 may update link status information for LAG 114 and may also re-calculate an aggregated capacity of LAG 114 based on the link failure.

In some embodiments, network switch 104 may determine whether a different (e.g., LAG 116) is preferable to LAG 114 based on LAG status information and other information stored in data storage 110. For example, using aggregated capacities and/or other information about LAG 116 and LAG 114, network switch 104 may determine whether an aggregated capacity of the second LAG is greater than an aggregated capacity of the first LAG. In another example, network switch 104 may use LAG status information to determine whether a failover operation is preferable to current operations and/or communications path.

In some embodiments, updating port tables may be in response to determining that a second LAG is preferable to a currently utilized LAG. For example, network switch 104 may be configured to send traffic based on one or port or network switching tables. In this example, the port tables may indicate that certain traffic (e.g., traffic received via egress ports 5-8 with destinations associated with external network switch 120) should be sent via ports 1-4 associated with LAG 114. Continuing with this example, network switch 104 may determine that a different LAG and/or network switch may be preferable to LAG 114 and may update its port tables or other data such that the different LAG or network switch is utilized instead of LAG 114.

In some embodiments, updating port tables or other data such that a different LAG or network switch is utilized may involve performing a failover operation. For example, a failover operation may involve using one or more redundant network nodes and/or a related LAG. In this example, a failover operation may involve network switch 104 updating its port tables to send traffic via LAG 118 to network switch 106, where the traffic is sent to external network switch 122 via LAG 116. In another example, a failover operation may involve network switch 104 updating its port tables to block traffic from server 102. In this example, by blocking traffic from server 102, server 102 may send the traffic to external network switch 122 via network switch 106 and LAG 116.

In step 3, a LAG status update message and/or other messages may be sent from network switch 104 to network switch 106. In some embodiments, a LAG status update message may include a LAG identifier, an amount of operational links in LAG 114, an aggregated capacity of LAG 114, and/or other LAG status information about LAG 114. Examples of LAG status information in a LAG status update message may include a current aggregated LAG capacity (e.g., the combined capacity or bandwidth of all operational links in a LAG are operational), a maximum aggregated LAG capacity (e.g., the combined capacity or bandwidth if all links in a LAG are operational), and/or link status information for one or more links in a LAG.

In step 4, after receiving a LAG status update message, port tables (e.g., network switching tables) and/or LAG related information may be updated by network switch 106. For example, network switch 106 may be configured to store LAG status information in data storage 112. In this example, network switch 106 may update LAG status information for LAG 114 based on information received from network switch 104 and may also re-calculate an aggregated capacity of LAG 114 based on this information.

In some embodiments, network switch 106 may initiate or prepare for a failover operation. For example, after receiving a LAG status update message, network switch 106 may be configured to determine that a failover operation should be performed (e.g., using LAG 116 is preferable to using LAG 114) based on received LAG status information and other information stored in data storage 112. In this example, after determining that a failover operation is likely to be initiated, network switch 106 may perform various actions (e.g., initialization and/or provisioning actions) to get ready for receiving failover traffic.

It will be appreciated that FIG. 3 is for illustrative purposes and that additional steps than those depicted in FIG. 3 can be usable for detecting, receiving, using, and/or sending LAG status information. Additionally, it will be appreciated that steps depicted in FIG. 3 can occur in a different order than depicted or can be combined.

Further, it will be appreciated that LAG status information may be detected, received, and/or sent at various intervals and/or dynamically. For example, a LAG status transmitting node (e.g., network switch 104) may monitor or determine link connectivity or other LAG related issues constantly and/or at various intervals (e.g., every 10 seconds, when network conditions or related thresholds are met, etc.). In this example, the LAG status transmitting node may provide updated LAG status information to recipients as changes occur, at various (e.g., periodic or aperiodic) intervals, and/or based on a network operator's preferences.

Figure 4:
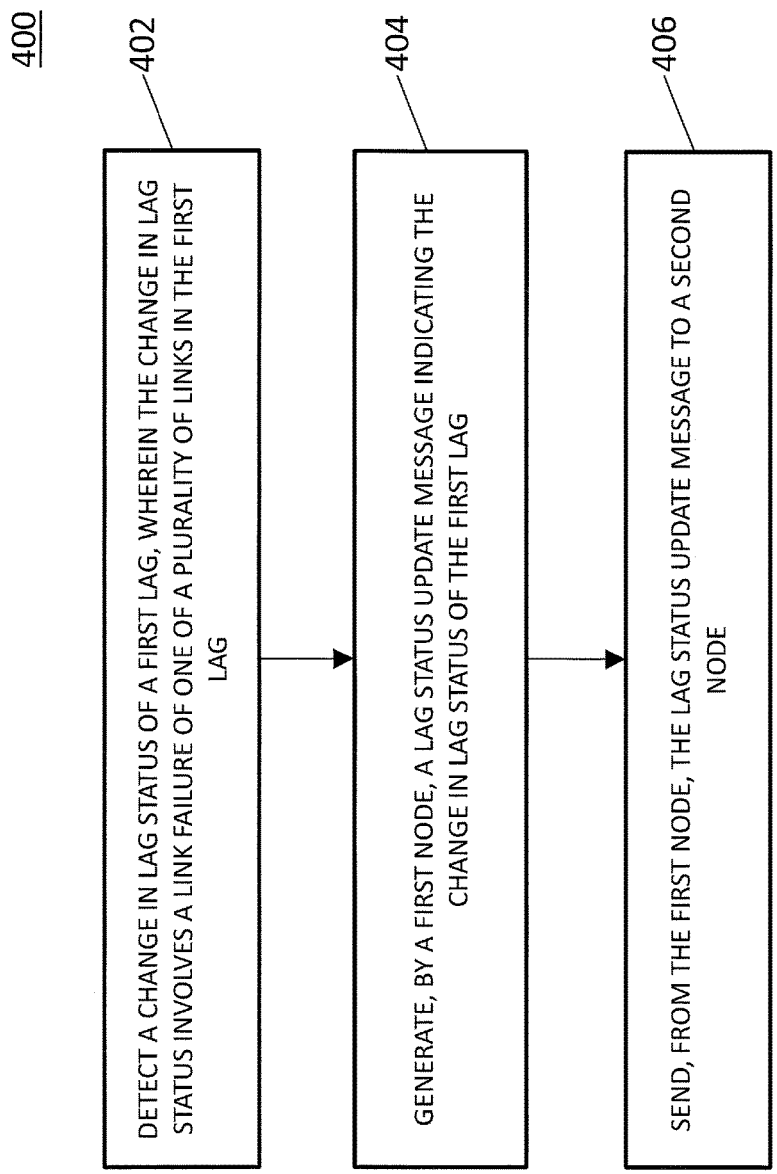
FIG. 4 is a diagram illustrating a process for sending LAG status information according to an embodiment of the subject matter described herein.

FIG. 4 is a diagram illustrating a process 400 for sending LAG status information according to an embodiment of the subject matter described herein. In some embodiments, process 400, or portions thereof (e.g., steps 402, 404, and/or 406), may be performed by or at network switch 104, network switch 106, LAG status module 108, and/or another node or module.

Referring to process 400, in step 402, a change in LAG status of a first LAG may be detected. The change in LAG status may involve a link failure of one of a plurality of links in the first LAG. For example, network switch 104 or LAG status module 108 may use network discovery protocol messages (e.g., neighbor discovery protocol (NDP) messages or open shortest path first (OSPF) messages) to determine whether one or more links in LAG 114 or LAG 118 are operational. In this example, if the network discovery protocol messages indicate a link failure associated with a LAG 114, network switch 104 or LAG status module 108 may perform various actions, e.g., modifying stored LAG status information about LAG 114 and/or informing other entities, such as network switch 106 or a network operator.

In step 404, a LAG status update indicating the change in LAG status of the first LAG may be generated by a first node. For example, after detecting a link failure associated with LAG 114, network switch 104 or LAG status module 108 may generate a LAG status update message indicating that an aggregated capacity of LAG 114 has decreased. In another example, a LAG status update message may indicate an amount of operational links of LAG 114. In another example, a LAG status update message may indicate a link failure by indicating one or more individual link statuses associated with LAG 114.

In step 406, the LAG status update message may be sent from the first node to a second node. For example, network switch 104 or LAG status module 108 may send a LAG status update message to network switch 106. In this example, the LAG status update message may trigger network switch 106 to determine whether to initiate and/or prepare for a failover operation.

It will be appreciated that process 400 is for illustrative purposes and that different and/or additional actions may be used. It will also be appreciated that various actions described herein may occur in a different order or sequence.

Figure 5:
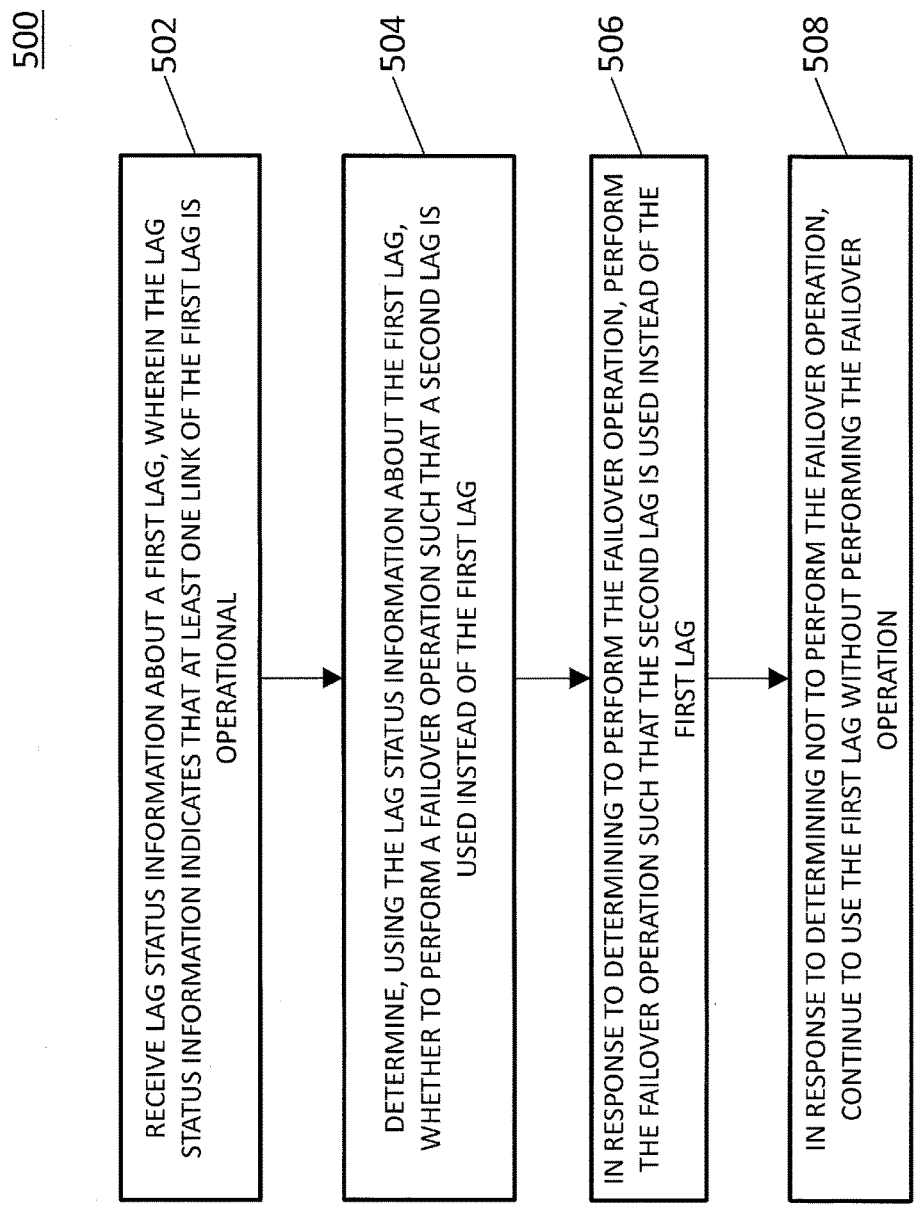
FIG. 5 is a diagram illustrating a process for using LAG status information according to an embodiment of the subject matter described herein.

FIG. 5 is a diagram illustrating a process 500 for sending LAG status information according to an embodiment of the subject matter described herein. In some embodiments, process 500, or portions thereof (e.g., steps 502, 504, 506, and/or 508), may be performed by or at network switch 104, network switch 106, LAG status module 108, and/or another node or module.

Referring to process 500, in step 502, LAG status information about a first LAG may be received. LAG status information may indicate that at least one link of the first LAG is operational, such as a link failure of one of a plurality of links in the first LAG. For example, network switch 104 or LAG status module 108 may monitor traffic associated with each link in LAG 114. In this example, if a link failure is detected based on monitored traffic, network switch 104 or LAG status module 108 may determine whether to perform a failover operation and/or other actions, e.g., modifying stored LAG status information about LAG 114 and/or informing other entities, such as network switch 106, another LAG status module 108, or a network operator.

In some embodiments, LAG status information may include an amount of operational links associated with a LAG, an aggregated capacity of a LAG, individual link capacities of one or more links of a LAG, QoS information associated with a LAG, and/or congestion information associated with a LAG.

In some embodiments, detecting a change in LAG status of a first LAG may include determining whether traffic is received via each link in the first LAG within an acceptable time period. For example, network discovery protocol messages may be used to detect whether a link of LAG 114 is operational. In this example, if the network discovery protocol message does trigger a response message or an error message is received, the link may be deemed non-operational and/or a link failure may be detected.

In some embodiments, after a change in status of a first LAG is detected, a LAG status update message indicating LAG status information about the first LAG may be generated and sent to a network node.

In some embodiments, a network node (e.g., a computing platform that receives or sends LAG status information) may include a network switch, a router, a Diameter routing agent, a packet forwarding device, a server, or a signaling message router.

In some embodiments, receiving LAG status information about a first LAG may include receiving a LAG status update message indicating the LAG status information about the first LAG.

In some embodiments, a LAG status update message may trigger a node (e.g., a recipient node) to determine whether a second LAG is preferable over a first LAG. For example, after receiving a LAG status update message from network switch 104 indicating that all the links of LAG 114 are operational and/or that LAG 114 has more operational links than LAG 116, network switch 106 or LAG status module 108 therein may determine whether to perform a failover operation such that the LAG 114 is used instead of LAG 116.

In some embodiments, a LAG status update message may indicate an aggregated capacity of a LAG, an amount of operational links associated with a LAG, a link status for each link of a LAG, a link status for each link of a LAG that has changed since a previous LAG status update message, QoS information associated with a LAG, and/or congestion information associated with a LAG.

In step 504, it may be determined, using the LAG status information about the first LAG, whether to perform a failover operation such that a second LAG is used instead of the first LAG. For example, using aggregated capacities and/or other information about LAG 116 and LAG 114, network switch 104 or LAG status module 108 may determine whether LAG 114 should continue to be used for traffic or whether LAG 116 should be used instead.

In some embodiments, determining whether to perform a failover operation may include determining whether a second LAG has more operational links than the first LAG.

In some embodiments, determining whether to perform a failover operation may include determine whether an aggregated capacity of the second LAG is greater than an aggregated capacity of the first LAG.

In step 506, in response to determining to perform the failover operation, the failover operation may be performed such that the second LAG is used instead of the first LAG. For example, after determining that LAG 114 is not preferable to LAG 116 for handling traffic from server 102, network switch 104 or LAG status module 108 may modify port tables and/or configurations such that network switch 106 handles traffic from server 102 and sends the traffic to external network switch 122 via LAG 116.

In step 508, in response to determining not to perform the failover operation, the first LAG may continue to be used without performing the failover operation. For example, after determining that LAG 114 is preferable to LAG 116 for handling traffic from server 102, network switch 104 or LAG status module 108 may prevent a failover operation and continue to use LAG 114 to send traffic.

It will be appreciated that process 500 is for illustrative purposes and that different and/or additional actions may be used. It will also be appreciated that various actions described herein may occur in a different order or sequence.

It should be noted that network switch 104, network switch 106, LAG status module 108, and/or functionality described herein may constitute a special purpose computing device. Further, network switch 104, network switch 106, LAG status module 108, and/or functionality described herein can improve the technological field of network communications by providing scalable mechanisms for providing LAG status information. Further, network switch 104, network switch 106, LAG status module 108, and/or functionality described herein can improve the technological field of LAG related failover management by using LAG status information when determining whether to perform failover operation. By using LAG status information when determining whether to perform a failover operation, traffic load (re)distribution may be performed more efficiently such that failover operations occur when a better LAG is available (e.g., a LAG with more operational links or a greater aggregated capacity than a currently utilized LAG).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as group forth hereinafter.

What is claimed is:

1. A method for using link aggregation group (LAG) status information, the method comprising:
   at a first network switch:
      receiving, from a second network switch, link aggregation group (LAG) status information about a first LAG, wherein the LAG status information indicates that at least one link of the first LAG is operational; and
      determining, using the LAG status information, an aggregated capacity of the first LAG for performing a failover operation such that a second LAG is used instead of the first LAG, wherein determining to perform the failover operation includes determining that an aggregated capacity of the second LAG is greater than an aggregated capacity of the first LAG, wherein the second LAG is a different LAG from the first LAG, wherein determining the aggregated capacity of the first LAG includes summing link capacities of operational links of the first LAG and determining the aggregated capacity of the second LAG includes summing link capacities of operational links of the second LAG; and
      in response to determining to perform the failover operation, performing the failover operation such that the second LAG is used instead of the first LAG.

2. The method of claim 1 wherein determining to perform the failover operation includes determining that the second LAG has more operational links than the first LAG.

3. The method of claim 1 wherein the LAG status information includes an amount of operational links associated with the first LAG, the aggregated capacity of the first LAG, individual link capacities of one or more links of the first LAG, quality of service (QoS) information associated with the first LAG, or congestion information associated with the first LAG.

4. The method of claim 1 wherein receiving the LAG status information about the first LAG includes receiving a LAG status update message indicating the LAG status information about the first LAG.

5. The method of claim 4 wherein the LAG status update message indicates an aggregated capacity of the first LAG, an amount of operational links associated with the first LAG, a link status for each link of the first LAG, a link status for each link of the first LAG that has changed since a previous LAG status update message, quality of service (QoS) information associated with the first LAG, or congestion information associated with the first LAG.

6. The method of claim 1 wherein receiving the LAG status information about the first LAG includes detecting a change in status of the first LAG.

7. The method of claim 6 wherein detecting the change in status of the first LAG includes determining whether traffic is received via each link of the first LAG within an acceptable time period.

8. The method of claim 6 comprising:
   after detecting the change in status of the first LAG:
      generating a LAG status update message indicating the LAG status information about the first LAG; and
      sending the LAG status update message to a network node.

9. The method of claim 8 wherein the network node includes the second network switch, a router, a Diameter routing agent, a packet forwarding device, a server, or a signaling message router.

10. A system for using link aggregation group (LAG) status information, the system comprising:
   a first network switch including:
      a processor; and
      a memory,
      wherein the first network switch is configured to receive, from a second network switch, link aggregation group (LAG) status information about a first LAG, wherein the LAG status information indicates that at least one link of the first LAG is operational, to determine, using the LAG status information, an aggregated capacity of the first LAG for performing a failover operation such that a second LAG is used instead of the first LAG, wherein determining to perform the failover operation includes determining that an aggregated capacity of the second LAG is greater than an aggregated capacity of the first LAG, wherein the second LAG is a different LAG from the first LAG, wherein determining the aggregated capacity of the first LAG includes summing link capacities of operational links of the first LAG and determining the aggregated capacity of the second LAG includes summing link capacities of operational links of the second LAG, and in response to determining to perform the failover operation, to perform the failover operation such that the second LAG is used instead of the first LAG.

11. The system of claim 10 wherein the first network switch is configured to determine that the second LAG has more operational links than the first LAG.

12. The system of claim 10 wherein the LAG status information includes an amount of operational links associated with the first LAG, the aggregated capacity of the first LAG, individual link capacities of one or more links of the first LAG, quality of service (QoS) information associated with the first LAG, or congestion information associated with the first LAG.

13. The system of claim 10 wherein the first network switch is configured to receive the LAG status information about the first LAG by receiving a LAG status update message indicating the LAG status information about the first LAG.

14. The system of claim 13 wherein the LAG status update message indicates an aggregated capacity of the first LAG, an amount of operational links associated with the first LAG, a link status for each link of the first LAG, a link status for each link of the first LAG that has changed since a previous LAG status update message, quality of service (QoS) information associated with the first LAG, or congestion information associated with the first LAG.

15. The system of claim 10 wherein the first network switch is configured to receive the LAG status information the first LAG by detecting a change in status of the first LAG.

16. The system of claim 15 wherein detecting the change in status of the first LAG includes determining whether traffic is received via each link of the first LAG within an acceptable time period.

17. The system of claim 15 wherein after detecting the change in status of the first LAG, the first network switch is configured to generate a LAG status update message indicating the LAG status information about the first LAG and send the LAG status update message to a network node.

18. The system of claim 17 wherein the network node includes the second network switch, a router, a Diameter routing agent, a packet forwarding device, a server, or a signaling message router.

19. A non-transitory computer readable medium comprising computer executable instructions that when executed by a processor of a computer cause the computer to perform steps comprising:
at a first network switch:
receiving, from a second network switch, link aggregation group (LAG) status information about a first LAG, wherein the LAG status information indicates that at least one link of the first LAG is operational; and
determining, using the LAG status information, an aggregated capacity of the first LAG for performing a failover operation such that a second LAG is used instead of the first LAG, wherein determining to perform the failover operation includes determining that an aggregated capacity of the second LAG is greater than an aggregated capacity of the first LAG, wherein the second LAG is a different LAG from the first LAG, wherein determining the aggregated capacity of the first LAG includes summing link capacities of operational links of the first LAG and determining the aggregated capacity of the second LAG includes summing link capacities of operational links of the second LAG; and
in response to determining to perform the failover operation, performing the failover operation such that the second LAG is used instead of the first LAG.

20. The non-transitory computer readable medium of claim 19 wherein determining to perform the failover operation includes determining that the second LAG has more operational links than the first LAG.

* * * * *

UNITED STATES PATENT AND TRADEMARK OFFICE
CERTIFICATE OF CORRECTION

PATENT NO. : 10,110,421 B2
APPLICATION NO. : 14/927377
DATED : October 23, 2018
INVENTOR(S) : Morris Page 1 of 1

It is certified that error appears in the above-identified patent and that said Letters Patent is hereby corrected as shown below:

In the Claims

In Column 15, Line 30, in Claim 15, after "information" insert -- about --.

Signed and Sealed this
Seventh Day of January, 2020

Andrei Iancu
*Director of the United States Patent and Trademark Office*